US011749257B2

(12) United States Patent
Guo et al.

(10) Patent No.: US 11,749,257 B2
(45) Date of Patent: Sep. 5, 2023

(54) METHOD FOR EVALUATING A SPEECH FORCED ALIGNMENT MODEL, ELECTRONIC DEVICE, AND STORAGE MEDIUM

(71) Applicant: BEIJING CENTURY TAL EDUCATION TECHNOLOGY CO., LTD., Beijing (CN)

(72) Inventors: Lizhao Guo, Beijing (CN); Song Yang, Beijing (CN); Junfeng Yuan, Beijing (CN)

(73) Assignee: BEIJING CENTURY TAL EDUCATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/178,813

(22) Filed: Mar. 6, 2023

(65) Prior Publication Data
US 2023/0206902 A1    Jun. 29, 2023

Related U.S. Application Data

(63) Continuation of application No. PCT/CN2021/108899, filed on Jul. 28, 2021.

(30) Foreign Application Priority Data

Sep. 7, 2020   (CN) .......................... 202010925650.2

(51) Int. Cl.
*G10L 15/05* (2013.01)
*G10L 15/01* (2013.01)
*G10L 15/02* (2006.01)

(52) U.S. Cl.
CPC .............. *G10L 15/01* (2013.01); *G10L 15/02* (2013.01); *G10L 2015/025* (2013.01)

(58) Field of Classification Search
None
See application file for complete search history.

(56) References Cited

U.S. PATENT DOCUMENTS 5,333,275 A * 7/1994 Wheatley ................ G10L 15/18
704/231
7,216,079 B1   5/2007 Barnard et al.
(Continued)

FOREIGN PATENT DOCUMENTS

CN      101651788 A      2/2010
CN      108510978 A      9/2018
(Continued)

OTHER PUBLICATIONS

PCT International search report of PCT/CN2021/108899 dated Oct. 11, 2021.
(Continued)

*Primary Examiner* — Jakieda R Jackson
(74) *Attorney, Agent, or Firm* — Emerson, Thomson & Bennett, LLC; Roger D. Emerson; Peter R. Detorre

(57) ABSTRACT

A method for evaluating a speech forced alignment model, an electronic device, and a storage medium are provided. The method includes: according to each audio segment in a test set and a text corresponding to each audio segment, acquiring, by using a speech forced alignment model to be evaluated, a phoneme sequence corresponding to each audio segment and a predicted start time and a predicted end time of each phoneme in the phoneme sequence; for each phoneme, obtaining a time accuracy score of the phoneme according to the predicted start time and the predicted end time of the phoneme and a predetermined reference start time and a predetermined reference end time of the pho- (Continued)

neme; and determining a time accuracy score of said speech forced alignment model according to the time accuracy score of each phoneme.

20 Claims, 5 Drawing Sheets

(56) References Cited

U.S. PATENT DOCUMENTS

| | | | | |
|---|---|---|---|---|
| 9,336,782 | B1* | 5/2016 | Patel | G10L 13/04 |
| 9,947,322 | B2* | 4/2018 | Kang | G10L 25/60 |
| 11,062,615 | B1* | 7/2021 | Speciner | G09B 5/06 |
| 2004/0193408 | A1* | 9/2004 | Hunt | G10L 15/08 |
| | | | | 704/E15.014 |
| 2009/0326947 | A1* | 12/2009 | Arnold | G06Q 30/02 |
| | | | | 707/999.005 |
| 2010/0324900 | A1 | 12/2010 | Faifkov et al. | |
| 2013/0019738 | A1* | 1/2013 | Haupt | G10L 21/013 |
| | | | | 84/622 |
| 2014/0058731 | A1* | 2/2014 | Tyagi | G10L 15/063 |
| | | | | 704/243 |
| 2014/0372117 | A1* | 12/2014 | Nakata | G10L 15/26 |
| | | | | 704/235 |
| 2015/0088508 | A1* | 3/2015 | Bharadwaj | G10L 15/063 |
| | | | | 704/237 |
| 2016/0379622 | A1* | 12/2016 | Patel | G10L 13/033 |
| | | | | 704/260 |
| 2017/0011738 | A1* | 1/2017 | Senior | G10L 15/063 |
| 2017/0084295 | A1* | 3/2017 | Tsiartas | G10L 17/08 |
| 2017/0160813 | A1* | 6/2017 | Divakaran | G06N 3/006 |
| 2018/0068662 | A1* | 3/2018 | Schlippe | G10L 25/90 |
| 2018/0314689 | A1* | 11/2018 | Wang | G10L 15/1822 |
| 2020/0090681 | A1* | 3/2020 | Hu | A61B 5/4803 |
| 2020/0293266 | A1* | 9/2020 | German | G10L 13/08 |

FOREIGN PATENT DOCUMENTS

| | | |
|---|---|---|
| CN | 109326277 A | 2/2019 |
| CN | 109377981 A | 2/2019 |
| CN | 109545243 A | 3/2019 |
| CN | 109903752 A | 6/2019 |
| CN | 111105785 A | 5/2020 |
| CN | 111312231 A | 6/2020 |
| CN | 111798868 A | 10/2020 |
| WO | WO2020027394 A1 | 2/2020 |

OTHER PUBLICATIONS

Gonzaleza, S. et al., "Comparing the performance of forced aligners used in sociophonetic research", Linguistics Vanguard 2020 (20190058), published Apr. 18, 2020.

Stolcke, A., et al. "Highly accurate phonetic segmentation using boundary correction models and system fusion", 2014 IEEE International Conference on Acoustics, Speech and Signal Processing (ICASSP), published May 2014.

Kreuk, F. et al., "Phoneme Boundary Detection using Learnable Segmental Features", arXiv preprint arXiv:2002.04992, published Feb. 16, 2020.

* cited by examiner

METHOD FOR EVALUATING A SPEECH FORCED ALIGNMENT MODEL, ELECTRONIC DEVICE, AND STORAGE MEDIUM

CROSS-REFERENCE TO RELATED APPLICATIONS

This disclosure is a continuation of international application NO. PCT/CN2021/108899 filed on Jul. 28, 2021, which claims the priority of the Chinese patent application with the application number 202010925650.2 and the title of the invention "METHOD AND APPARATUS FOR EVALUATING A SPEECH FORCED ALIGNMENT MODEL, ELECTRONIC DEVICE, AND STORAGE MEDIUM" submitted to the China Patent Office on Sep. 7, 2020, the entire contents of which are incorporated by reference in this disclosure.

TECHNICAL FIELD

Embodiments of the present disclosure relate to the field of computers, and in particular, to a method for evaluating a speech forced alignment model, an electronic device, and a storage medium.

BACKGROUND

With the development of computer technology and deep learning technology, speech synthesis technology has been widely used, such as: speech broadcast, speech navigation and smart speakers.

In speech synthesis, a speech synthesis model needs to be trained to improve the performance of speech synthesis. In order to realize the training of the speech synthesis model, it is necessary to obtain phoneme time points for training speech.

In order to obtain the phoneme time points, typically, speech forced alignment technology (i.e., machine annotation) is used. The speech forced alignment technology is a technology to determine a phoneme time point through a forced alignment model. However, in the related art, an accuracy of phoneme time points obtained through the forced alignment model is not high

SUMMARY

Embodiments of the present disclosure provide a method for evaluating a speech forced alignment model, an electronic device, and a storage medium, so as to realize accuracy evaluation of the speech forced alignment model on the basis of low cost.

In order to solve the above problem, an embodiment of the present disclosure provides a method for evaluating a speech forced alignment model, including:

acquiring, by using a to-be-evaluated speech forced alignment model, based on each audio segment in a test set and a text corresponding to each of the audio segments, a phoneme sequence corresponding to each audio segment and a predicted start time and a predicted end time of each phoneme in the phoneme sequence;

acquiring, for each phoneme, based on the predicted start time and the predicted end time of the phoneme and a predetermined reference start time and a predetermined reference end time of the phoneme, a time accuracy score of the phoneme, where the time accuracy score is a degree of proximity of the predicted start time and the predicted end time of each of the phonemes of each of the phonemes to the reference start time and the reference end time corresponding to the predicted start time and the predicted end time; and acquiring, based on the time accuracy score of each phoneme, a time accuracy score of the to-be-evaluated speech forced alignment model.

In order to solve the above problem, an embodiment of the present disclosure provides an apparatus for evaluating a speech forced alignment model, including:

a first acquisition unit, configured to acquire, by using a to-be-evaluated speech forced alignment model, based on each audio segment in a test set and a text corresponding to each audio segment, a phoneme sequence corresponding to each audio segment and a predicted start time and a predicted end time of each phoneme in the phoneme sequence;

a second acquisition unit, configured to acquire, for each phoneme, based on the predicted start time and the predicted end time of the phoneme and a predetermined reference start time and a predetermined reference end time of the phoneme, a time accuracy score of the phoneme, where the time accuracy score is indicative of a degree of proximity of the predicted start time and the predicted end time to the reference start time and the reference end time of the phoneme; and a third acquisition unit, configured to acquire, based on the time accuracy score of each phoneme, a time accuracy score of the to-be-evaluated speech forced alignment model.

In order to solve the above problem, an embodiment of the present disclosure provides a storage medium, the storage medium stores program instructions for evaluating a speech forced alignment model, so as to implement the method for evaluating a speech forced alignment model described in any one of the foregoing.

In order to solve the above problem, an embodiment of the present disclosure provides an electronic device, including at least one memory and at least one processor, where the memory stores program instructions, and the processor executes the program instructions to perform the method for evaluating a speech forced alignment model described in any one of the foregoing.

Compared with the prior art, the technical solution of the embodiment of the present disclosure has the following advantages:

The method for evaluating a speech forced alignment model, the electronic device, and the storage medium provided by the embodiments of the present disclosure, where the method for evaluating a speech forced alignment model includes first inputting each audio segment in the test set and the text corresponding to the audio into the to-be-evaluated speech forced alignment model, acquiring the phoneme sequence corresponding to each audio segment and the predicted start time and the predicted end time of each phoneme in each phoneme sequence by using the to-be-evaluated speech forced alignment model, then acquiring, based on the predicted start time and the predicted end time and the predetermined reference start time and the predetermined reference end time of the corresponding phoneme, the time accuracy score of each of the phonemes, acquiring the time accuracy score of the to-be-evaluated speech forced alignment model, based on the time accuracy score of each phoneme, realizing the evaluation of the to-be-evaluated speech forced alignment model. It can be seen that in the method for evaluating a speech forced alignment model provided by embodiments of the present disclosure, when evaluating the to-be-evaluated speech forced alignment model, based on the degree of proximity of the predicted start time and the predicted end time to the reference start time and the reference end time of each phoneme, may obtain the time accuracy score of each phoneme, and further obtain the time accuracy score of the to-be-evaluated speech forced alignment model. There is no need to manually retest each time the predicted start time and the predicted end time is acquired through the speech forced alignment model, or to verify the obtained speech through subsequent speech synthesis. The difficulty of evaluating the accuracy of the forced alignment model may be simplified, at the same time, a labor cost and time cost required for evaluating the accuracy of the forced alignment model may also be reduced, improving the efficiency.

In an optional solution, the method for evaluating a speech forced alignment model provided by embodiments of the present disclosure further includes, first determining a current phoneme for each phoneme, and constructing a phoneme combination of the current phoneme to obtain the phoneme combination of each phoneme. a combination method of the phoneme combination for each phoneme is identical. Then, when acquiring the time accuracy score of the to-be-evaluated speech forced alignment model, acquiring, based on the time accuracy score of each phoneme of the phoneme combination in the current phoneme, a time accuracy correction score of the current phoneme, to obtain a time accuracy correction score of each phoneme in the phoneme sequence, and acquiring the time accuracy score of the to-be-evaluated speech forced alignment model, based on the time accuracy correction score of each phoneme in the phoneme sequence. Thus, the method for evaluating a speech forced alignment model provided by embodiments of the present disclosure uses the time accuracy score of at least one phoneme adjacent to the current phoneme to correct the time accuracy score of the current phoneme, and uses context information of the current phoneme, taking into account the influence to the current phoneme by its adjacent phoneme, so that the obtained time accuracy score of the current phoneme is corrected to be more accurate.

In an optional solution, the method for evaluating a speech forced alignment model provided by embodiments of the present disclosure further includes, in order to acquire the time accuracy score of each of the phonemes, first acquiring a start time and end time intersection and a start time and end time union of the predicted start time and the predicted end time and the reference start time and the reference end time of the same phoneme, and then acquiring the time accuracy score of the corresponding phoneme, based on a ratio of the start time and end time intersection to the start time and end time union. Thus, the start time and end time intersection may represent an overlap amount of the predicted start time and the predicted end time and the reference start time and the reference end time, and the start time and end time union may represent a maximum overall amount of the predicted start time and the predicted end time and the reference start time and the reference end time. A weight and degree of the predicted start time and the predicted end time may be accurately expressed using the ratio of the start time and end time intersection to the start time and end time union, thereby acquiring the time accuracy score of the phoneme, and the time accuracy score of the phoneme can accurately represent the degree of proximity of the predicted start time and the predicted end time to the reference start time and the reference end time.

DETAILED DESCRIPTION OF EMBODIMENTS

Figure 1:
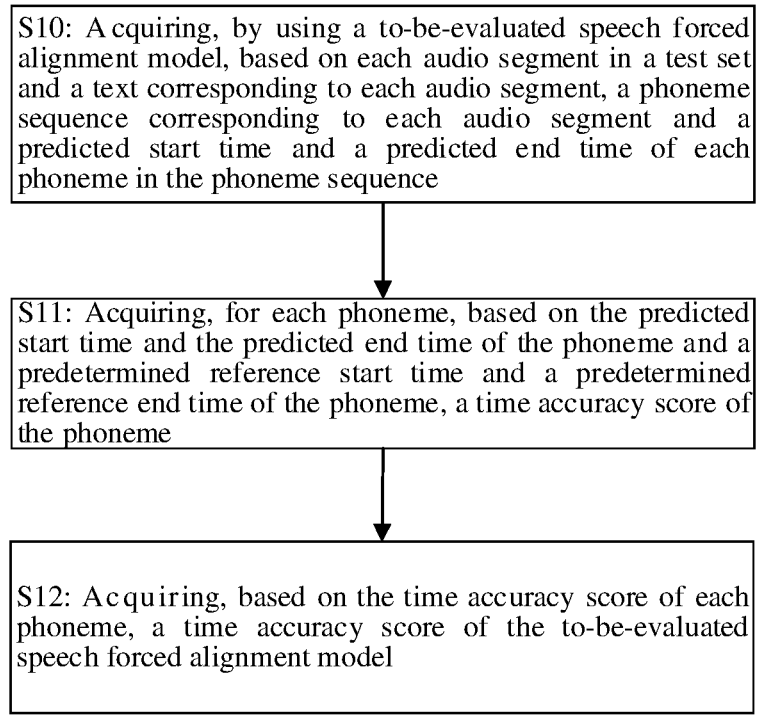
FIG. 1 is a schematic flowchart of a method for evaluating a speech forced alignment model provided by an embodiment of the present disclosure.

In related technologies, it is time-consuming and labor-intensive to manually evaluate a speech forced alignment model, and an evaluation result is also subject to subjective influence.

In this regard, an embodiment of the present disclosure provides a method for evaluating a speech forced alignment model, which can automatically implement accuracy evaluation of a speech forced alignment model. An embodiment of the present disclosure provides a method for evaluating a speech forced alignment model, including:

acquiring, by using a to-be-evaluated speech forced alignment model, based on each audio segment in a test set and a text corresponding to each audio segment, a phoneme sequence corresponding to each audio segment and a predicted start time and a predicted end time of each phoneme in the phoneme sequence;

acquiring, for each phoneme, based on the predicted start time and the predicted end time of the phoneme and a predetermined reference start time and a predetermined reference end time of the phoneme, a time accuracy score of the phoneme, where the time accuracy score is indicative of a degree of proximity of the predicted start time and the predicted end time to the reference start time and the reference end time of the phoneme; and acquiring, based on the time accuracy score of each phoneme, a time accuracy score of the to-be-evaluated speech forced alignment model.

Accordingly, the method for evaluating a speech forced alignment model provided by embodiments of the present disclosure includes first inputting each audio segment in the test set and the text corresponding to the audio into the to-be-evaluated speech forced alignment model, acquiring the phoneme sequence corresponding to each audio segment and the predicted start time and the predicted end time of each phoneme in each phoneme sequence by using the to-be-evaluated speech forced alignment model, then acquiring, based on the predicted start time and the predicted end time and the predetermined reference start time and the predetermined reference end time of the corresponding phoneme, the time accuracy score of each of the phonemes, acquiring the time accuracy score of the to-be-evaluated speech forced alignment model, based on the time accuracy score of each phoneme, realizing the evaluation of the to-be-evaluated speech forced alignment model.

It can be seen that in the method for evaluating a speech forced alignment model provided by embodiments of the present disclosure, when evaluating the to-be-evaluated speech forced alignment model, based on the degree of proximity of the predicted start time and the predicted end time to the reference start time and the reference end time of each phoneme, may obtain the time accuracy score of each phoneme, and further obtain the time accuracy score of the to-be-evaluated speech forced alignment model. There is no need to manually retest each time the predicted start time and the predicted end time is acquired through the speech forced alignment model, or to verify the obtained speech through subsequent speech synthesis. The difficulty of evaluating the accuracy of the forced alignment model may be simplified, at the same time, a labor cost and time cost required for evaluating the accuracy of the forced alignment model may also be reduced, improving the efficiency.

The technical solution in the embodiments of the present disclosure will be clearly and fully described below with reference to the accompanying drawings in the embodiments of the present disclosure. Apparently, the described embodiments are only some of the embodiments of the present disclosure, not all of the embodiments. Based on the embodiments in the present disclosure, all other embodiments obtained by those of ordinary skill in the art without making creative efforts belong to the protection scope of the present disclosure.

Referring to FIG. 1, FIG. 1 is a schematic flowchart of a method for evaluating a speech forced alignment model provided by an embodiment of the present disclosure.

As shown in the figure, the method for evaluating a speech forced alignment model provided by an embodiment of the present disclosure includes the following steps:

Step S10: acquiring, by using a to-be-evaluated speech forced alignment model, based on each audio segment in a test set and a text corresponding to each audio segment, a phoneme sequence corresponding to each audio segment and a predicted start time and a predicted end time of each phoneme in the phoneme sequence.

It may be easily understood that the method for evaluating a speech forced alignment model provided by embodiments of the present disclosure is used to evaluate a speech forced alignment effect of the to-be-evaluated speech forced alignment model, therefore, it is necessary to first establish a speech forced alignment model that needs to be evaluated or acquire an established speech forced alignment model, that is, the to-be-evaluated speech forced alignment model.

Each audio segment in the test set and the text corresponding to each audio segment may be input into the to-be-evaluated speech forced alignment model, so as to obtain the phoneme sequence corresponding to each audio segment and the predicted start time and the predicted end time of each phoneme in each phoneme sequence.

Certainly, the predicted start time and the predicted end time may include a time span from the predicted start time to the predicted end time.

Specifically, the to-be-evaluated speech forced alignment model may include a GMM model (Gaussian mixture model) and a Viterbi (viterbi) decoding model. Each audio segment in the test set and the text corresponding to each audio segment may be input into the GMM model to obtain an undecoded phoneme sequence and the predicted start time and the predicted end time, then decoded by the Viterbi decoding model to obtain the decoded phoneme sequence and the predicted start time and the predicted end time.

Step S11: acquiring, for each phoneme, based on the predicted start time and the predicted end time of the phoneme and a predetermined reference start time and a predetermined reference end time of the phoneme, a time accuracy score of the phoneme.

It may be understood that the time accuracy score is indicative of a degree of proximity of the predicted start time and the predicted end time to the reference start time and the reference end time of the phoneme.

The reference start time and the reference end time refers to a start time and an end time of phoneme used as an evaluation reference, which may be acquired by manual annotation.

By comparing the degree of proximity of the predicted start time and the predicted end time to the reference start time and the reference end time of the same phoneme, the time accuracy score of the phoneme may be obtained, until the time accuracy score of each phoneme is obtained.

Figure 2:
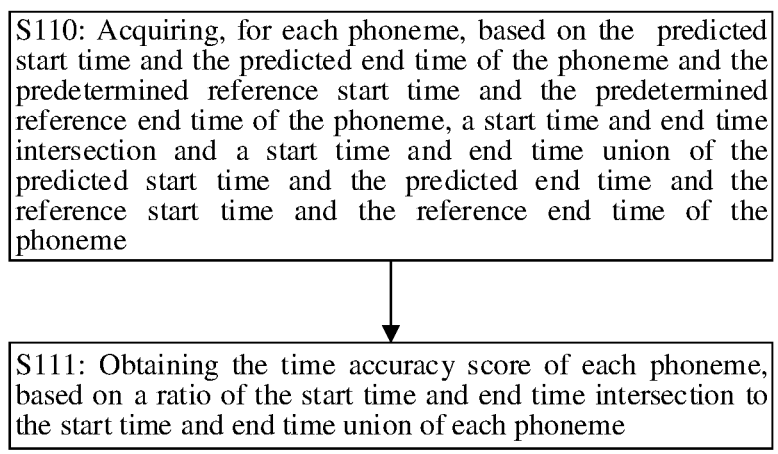
FIG. 2 is a schematic flowchart of steps for acquiring a time accuracy score of each phoneme in the method for evaluating a speech forced alignment model provided by an embodiment of the present disclosure.

In a specific embodiment, in order to facilitate the acquisition of the time accuracy score of each phoneme, referring to FIG. 2, FIG. 2 is a schematic flowchart of steps for acquiring a time accuracy score of each phoneme in the method for evaluating a speech forced alignment model provided by an embodiment of the present disclosure.

As shown in the figure, the method for evaluating a speech forced alignment model provided by an embodiment of the present disclosure may acquire the time accuracy score of each phoneme through the following steps:

Step S110: acquiring, for each phoneme, based on the predicted start time and the predicted end time of the phoneme and the predetermined reference start time and the predetermined reference end time of the phoneme, a start time and end time intersection and a start time and end time union of the predicted start time and the predicted end time and the reference start time and the reference end time of the phoneme.

It may be easily understood that the start time and end time intersection of the predicted start time and the predicted end time and the reference start time and the reference end time of the phoneme refers to overlap time of the predicted start time and the predicted end time and the reference start time and the reference end time of the same phoneme, and the start time and end time union of the predicted start time and the predicted end time and the reference start time and the reference end time of the phoneme refers to overall time of the predicted start time and the predicted end time and the reference start time and the reference end time of the same phoneme.

For example, for a phoneme "b", assuming that the predicted start time and the predicted end time is from the 3rd ms to the 5th ms, and the reference start time and the reference end time is from the 4th ms to the 6th ms, then the start time and end time intersection is from the 4th ms to the 5th ms, and the start time and end time union is from the 3rd ms to the 6th ms.

Step S111: obtaining the time accuracy score of each phoneme, based on a ratio of the start time and end time intersection to the start time and end time union of each phoneme.

After obtaining the start time and end time intersection and the start time and end time union of each phoneme, the ratio of the two may be further acquired to obtain the time accuracy score of each phoneme.

As in the foregoing example, the time accuracy score of the phoneme "b" is: the 4th ms to the 5th ms/the 3rd ms to the 6th ms, which is ⅓.

It may be understood that the greater a ratio score of the start time and end time intersection to the start time and end time union for a phoneme, the higher the accuracy of the to-be-evaluated speech forced alignment model for the phoneme.

Thus, the start time and end time intersection may represent an overlap amount of the predicted start time and the predicted end time and the reference start time and the reference end time, and the start time and end time union may represent a maximum overall amount of the predicted start time and the predicted end time and the reference start time and the reference end time. A weight and degree of the predicted start time and the predicted end time may be accurately expressed using the ratio of the start time and end time intersection to the start time and end time union, thereby acquiring the time accuracy score of the phoneme, and the time accuracy score of the phoneme can accurately represent the degree of proximity of the predicted start time and the predicted end time to the reference start time and the reference end time.

Step S12: acquiring, based on the time accuracy score of each phoneme, a time accuracy score of the to-be-evaluated speech forced alignment model.

After obtaining the time accuracy score of each phoneme in the test set, the time accuracy score of the to-be-evaluated speech forced alignment model may be further acquired through the time accuracy score of each phoneme.

In a specific embodiment, the time accuracy scores of the phonemes in the test set may be directly added to acquire the time accuracy score of the to-be-evaluated speech forced alignment model.

It may be easily understood that the higher the time accuracy score of each phoneme, the higher the time accuracy score of the to-be-evaluated speech forced alignment model, and the better the forced alignment effect of the to-be-evaluated speech forced alignment model, so as to evaluate the alignment effect of different speech forced alignment models, or evaluate the alignment effect of the speech forced alignment model before and after parameter adjustment.

It can be seen that in the method for evaluating a speech forced alignment model provided by embodiments of the present disclosure, when evaluating the to-be-evaluated speech forced alignment model, based on the degree of proximity of the predicted start time and the predicted end time to the reference start time and the reference end time of each phoneme, may obtain the time accuracy score of each phoneme, and further obtain the time accuracy score of the to-be-evaluated speech forced alignment model. There is no need to manually retest each time the predicted start time and the predicted end time is acquired through the speech forced alignment model, or to verify the obtained speech through subsequent speech synthesis. The difficulty of evaluating the accuracy of the forced alignment model may be simplified, at the same time, a labor cost and time cost required for evaluating the accuracy of the forced alignment model may also be reduced, improving the efficiency.

Figure 3:
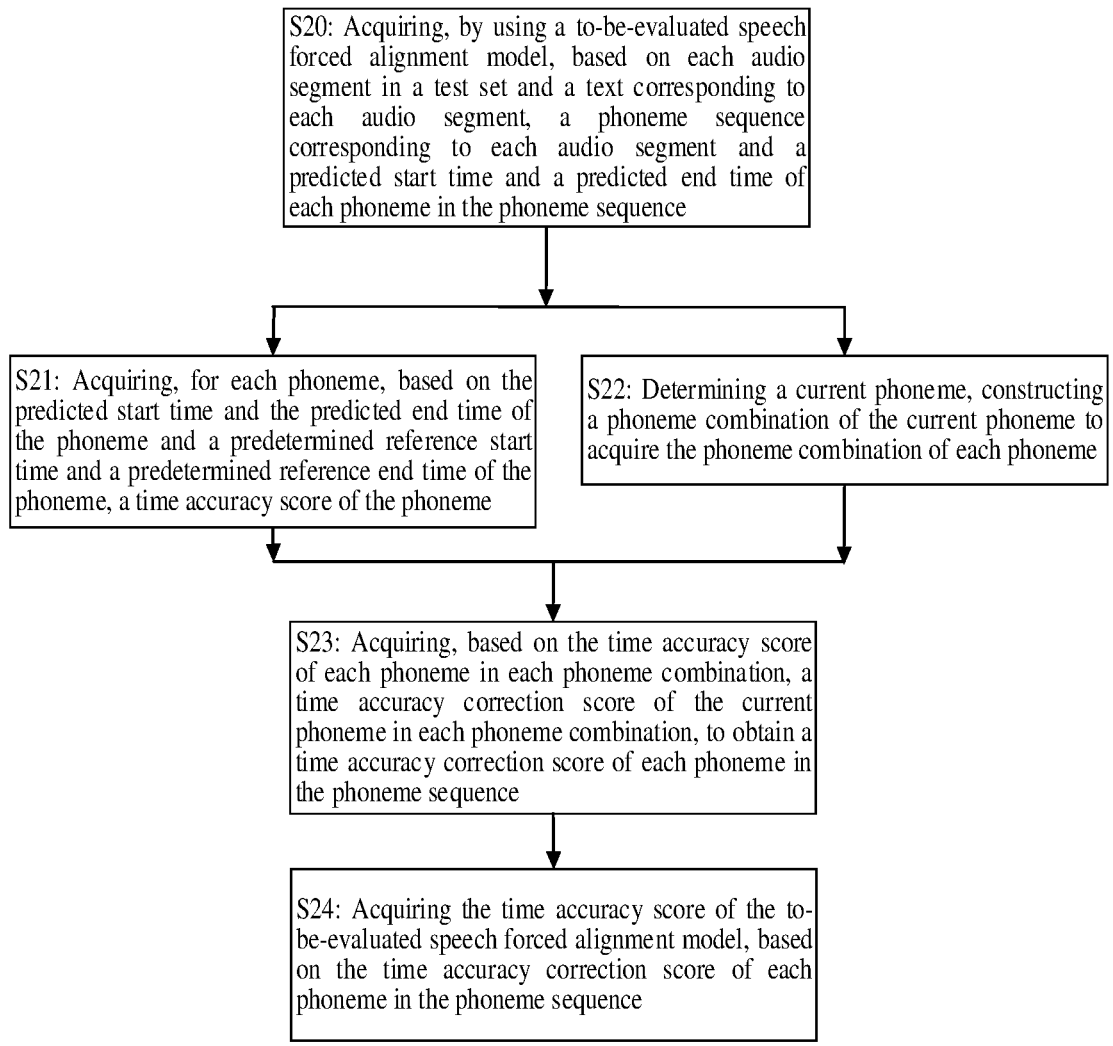
FIG. 3 is another schematic flowchart of the method for evaluating a speech forced alignment model provided by an embodiment of the present disclosure.

In order to further improve the accuracy for evaluating the speech forced alignment model, an embodiment of the present disclosure further provides another method for evaluating a speech forced alignment model, referring to FIG. 3, FIG. 3 is another schematic flowchart of the method for evaluating a speech forced alignment model provided by an embodiment of the present disclosure.

The method for evaluating a speech forced alignment model provided by an embodiment of the present disclosure includes:

Step S20: acquiring, by using a to-be-evaluated speech forced alignment model, based on each audio segment in a test set and a text corresponding to each audio segment, a phoneme sequence corresponding to each audio segment and a predicted start time and a predicted end time of each phoneme in the phoneme sequence.

For the specific content of step S20, reference may be made to the description of step S10 in FIG. 1, and detailed description thereof will be omitted.

Step S21: acquiring, for each phoneme, based on the predicted start time and the predicted end time of the phoneme and a predetermined reference start time and a predetermined reference end time of the phoneme, a time accuracy score of the phoneme.

For the specific content of step S21, reference may be made to the description of step S11 in FIG. 1, and detailed description thereof will be omitted.

Step S22: determining a current phoneme, constructing a phoneme combination of the current phoneme to acquire the phoneme combination of each phoneme.

Certainly, the phoneme combination includes the current phoneme and at least one phoneme adjacent to the current phoneme, and a combination method of the phoneme combination for each phoneme is identical.

After obtaining the phoneme sequence of each audio segment in the test set, a phoneme in the phoneme sequence is determined as the current phoneme, then at least one phoneme adjacent to the current phoneme is determined to form a phoneme combination with the current phoneme, thereby obtaining the phoneme combination corresponding to the current phoneme in the phoneme sequence. Each phoneme in the phoneme sequence is determined one by one as the current phoneme, so as to obtain the phoneme combination corresponding to each phoneme in the phoneme sequence.

It may be understood that if the phoneme combination is constructed and composed of 2 phonemes, each phoneme of the phoneme sequence may construct a phoneme combination consisting of 2 phonemes, and the method for combining is identical. It may be determined that an adjacent phoneme preceding the current phoneme and the current phoneme form the phoneme combination, certainly it may also be determined that an adjacent phoneme following the current phoneme and the current phoneme form the phoneme combination. If the phoneme combination is constructed and composed of 3 phonemes, then each phoneme of the phoneme sequence may construct a phoneme combination consisting of 3 phonemes, and the method for combining is identical. It may be determined that adjacent phonemes preceding and following the current phoneme and the current phoneme form the phoneme combination. If the phoneme combination is constructed and composed of 4 phonemes, then each phoneme of the phoneme sequence may construct a phoneme combination consisting of 4 phonemes, and the method for combining is identical. It may be determined that 2 phonemes preceding the current phoneme and 1 phoneme following the current phoneme, and the current phoneme form the phoneme combination, certainly, 1 phoneme preceding the current phoneme and 2 phonemes following the current phoneme may also be selected to form the phoneme combination with the current phoneme.

For example, for a phoneme sequence such as "jintian", it may be determined that when "t" is the current phoneme, if the phoneme combination is constructed and composed of 2 phonemes, the phoneme combination of the current phoneme "t" may be "int" or "tian", one of which may be selected as a phoneme combination of the current phoneme "t", or both may be used as the phoneme combinations of the current phoneme "t"; if the phoneme combination is constructed and composed of 3 phonemes, the phoneme combination of the current phoneme "t" may be "intian"; if the phoneme combination is constructed and composed of 4 phonemes, the phoneme combination of the current phoneme "t" may be "jintian" or "intian+silence", any one of which may be selected as a phoneme combination of the current phoneme "t", or both may be used as the phoneme combinations of the current phoneme "t".

Certainly, the phoneme combination constructed and composed of 2 phonemes, the phoneme combination constructed and composed of 3 phonemes, and the phoneme combination constructed and composed of 4 phonemes may all be used as the phoneme combinations of the same phoneme.

Since the start time and the end of each phoneme may be affected by its adjacent phonemes, taking the current phoneme and the adjacent phonemes into account to form the phoneme combination may provide subsequent corrections to the time accuracy score of the current phoneme.

Step S23: acquiring, based on the time accuracy score of each phoneme in each phoneme combination, a time accuracy correction score of the current phoneme in each phoneme combination, to obtain a time accuracy correction score of each phoneme in the phoneme sequence.

After obtaining the phoneme combination of each phoneme, the time accuracy score of each phoneme in the phoneme combination corresponding to the current phoneme is used to acquire the time accuracy correction score of the current phoneme.

As shown in the previous example, the phoneme combination is constructed and composed of 3 phonemes, then the phoneme combination of the current phoneme "t" being "intian" is used as an example, the time accuracy correction score of the current phoneme t may be:

$$Score(t)'=[Score(in)+Score(t)+Score(ian)]/3$$

Step S24: acquiring the time accuracy score of the to-be-evaluated speech forced alignment model, based on the time accuracy correction score of each phoneme in the phoneme sequence.

The specific content of step S24 may refer to the content of step S12 shown in FIG. 1, except that the time accuracy score of each phoneme is replaced by the time accuracy correction score of each phoneme, and the other content will be omitted.

The method for evaluating a speech forced alignment model provided by embodiments of the present disclosure uses the time accuracy score of at least one phoneme adjacent to the current phoneme to correct the time accuracy score of the current phoneme, and uses context information of the current phoneme, taking into account the influence to the current phoneme by its adjacent phoneme, so that the obtained time accuracy score of the current phoneme is corrected to be more accurate.

Figure 4:
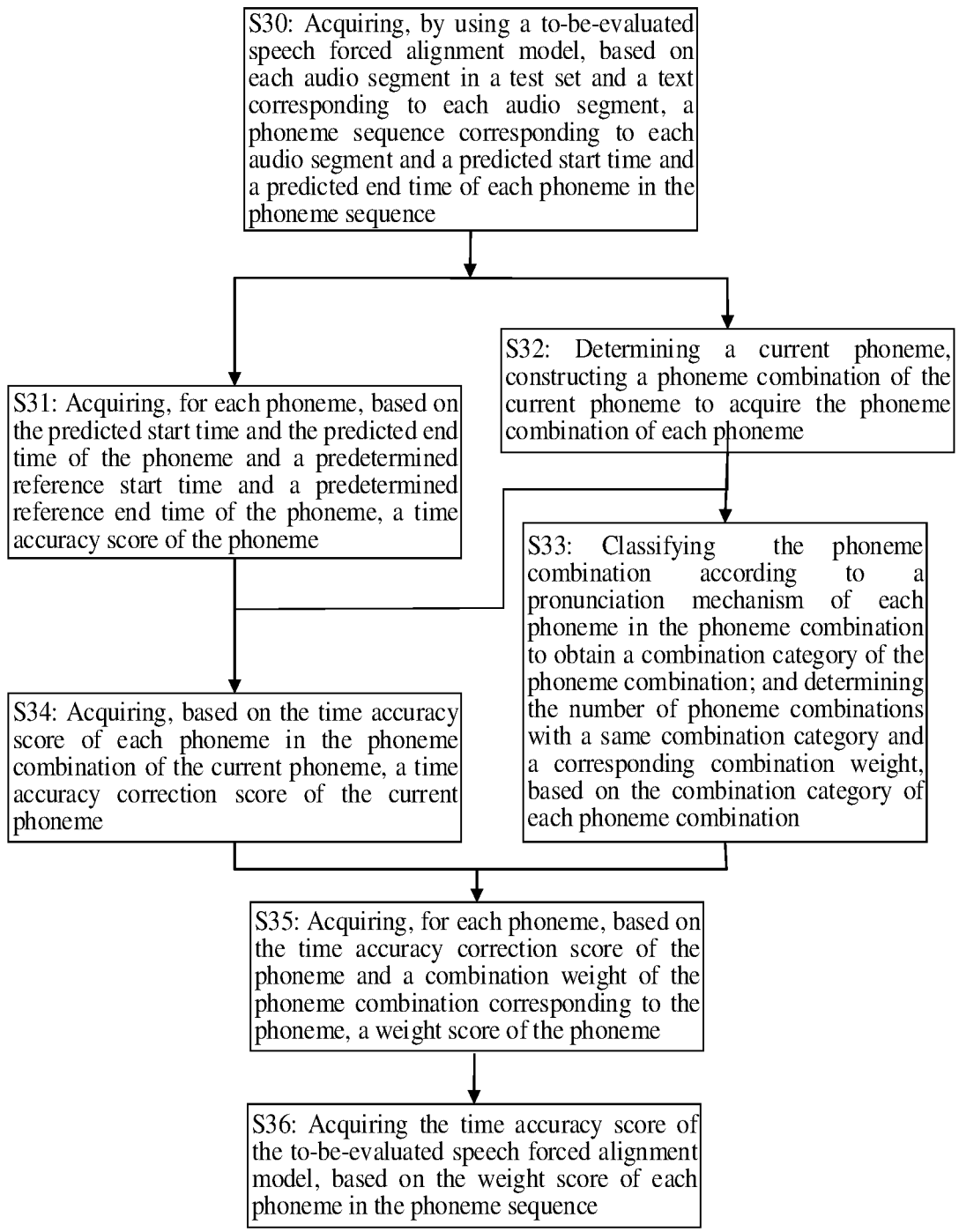
FIG. 4 is yet another schematic flowchart of the method for evaluating a speech forced alignment model provided by an embodiment of the present disclosure.

In order to further improve the accuracy of evaluation, an embodiment of the present disclosure further provides another method for evaluating a speech forced alignment model, referring to FIG. 4, FIG. 4 is yet another schematic flowchart of the method for evaluating a speech forced alignment model provided by an embodiment of the present disclosure.

As shown in the figure, the method for evaluating a speech forced alignment model provided by an embodiment of the present disclosure includes:

Step S30: acquiring, by using a to-be-evaluated speech forced alignment model, based on each audio segment in a test set and a text corresponding to each audio segment, a phoneme sequence corresponding to each audio segment and a predicted start time and a predicted end time of each phoneme in the phoneme sequence.

For the specific content of step S30, reference may be made to the description of step S10 in FIG. 1, and detailed description thereof will be omitted.

Step S31: acquiring, for each phoneme, based on the predicted start time and the predicted end time of the phoneme and a predetermined reference start time and a predetermined reference end time of the phoneme, a time accuracy score of the phoneme.

For the specific content of step S31, reference may be made to the description of step S11 in FIG. 1, and detailed description thereof will be omitted.

Step S32: determining a current phoneme, constructing a phoneme combination of the current phoneme to acquire the phoneme combination of each phoneme.

For the specific content of step S32, reference may be made to the description of step S22 in FIG. 3, and detailed description thereof will be omitted.

Step S33: classifying the phoneme combination according to a pronunciation mechanism of each phoneme in the phoneme combination to obtain a combination category of the phoneme combination; and determining the number of phoneme combinations with a same combination category and a corresponding combination weight, based on the combination category of each phoneme combination.

After obtaining the phoneme combination of each current phoneme, classification may be performed according to the pronunciation mechanism of each phoneme in the phoneme combination. Different pronunciation mechanism of adjacent phonemes may have a certain influence on parameters of the current phoneme, therefore, classification may be performed according to the pronunciation mechanism of each phoneme in the phoneme combination to determine the combination category of each phoneme combination, then, according to the combination category of the phoneme combination, the number of phoneme combinations with the same combination category may be determined, to further acquire the combination weight of a certain category of phoneme combination, and further acquire the weight score of each phoneme based on the combination weight, thereby reducing a difference in the time accuracy score of the to-be-evaluated speech forced alignment model due to a difference in the number of phonemes obtained based on the test set, and improving the evaluation accuracy of the method for evaluating a speech forced alignment model provided by embodiments of the present disclosure.

Specifically, the pronunciation mechanism may be divided according to initials and finals respectively, including a initial pronunciation mechanism and a final pronunciation mechanism, where the initial pronunciation mechanism includes a part pronunciation mechanism classified based on a pronunciation body part and a method pronunciation mechanism classified based on a pronunciation method, and the final pronunciation mechanism includes structure a pronunciation mechanism classified based on a structure of the final pronunciation and a mouth shape pronunciation mechanism classified based on a mouth shape.

The classification of the initial pronunciation mechanism may refer to Table 1:

TABLE 1

Initial pronunciation mechanism

| | Pronunciation method | | | | | | |
|---|---|---|---|---|---|---|---|
| | Stop (voiceless) | | Affricate (voiceless) | | Fricative | | Nasal | Lateral |
| Pronunciation body part | Unaspirated | Aspirated | Unaspirated | Aspirated | Voiceless | Voiced | Voiced | Voiced |
| Sound Lip  Bilabial sound | b | p | | | | | m | |
| Labiodental sound | | | | | f | | | |
| Blade-alveolar sound | d | t | | | | | n | l |
| Velar | | k | | | h | | | |
| Lingua-palatal sound | | | j | q | x | | | |
| Blade-palatal sound | | | zh | ch | sh | r | | |
| Apical front sound | | | z | c | s | | | |

The classification of the final pronunciation mechanism may refer to Table 2:

TABLE 2

Final pronunciation mechanism

| | Mouth shape | | | |
|---|---|---|---|---|
| Final Structure | Open mouth pronun- ciation | Aligned teeth pronun- ciation | Closed mouth pronun- ciation | Pursed mouth pronun- ciation |
| Single final | -i (before), -i (after) | i | u | ü |
| | a | ia | ua | |
| | o | | uo | |
| | e | | | üe |
| | ê | ie | | |
| | er | | | |
| Compound final | ai | | uai | |
| | ei | | uei | |
| | ao | iao | | |
| | ou | iou | | |
| Nasal final | an | ian | uan | üan |
| | en | in | uen | ün |
| | ang | iang | uang | |

Certainly, the pronunciation mechanism may be divided according to the pronunciation of other languages, such as English.

When dividing and grouping according to the pronunciation mechanism of pinyin, the pronunciation mechanism of initials and finals may be combined to obtain specific classification categories, for example: two-phoneme combination: bilabial sound+nasal final, nasal final+labiodental sound; three-phoneme combination: bilabial sound+nasal final+labiodental sound, single final+bilabial sound+single final, or single final with open mouth pronunciation+bilabial sound with stop+single final with aligned teeth pronunciation; four-phoneme combination: single final+bilabial sound+single final+bilabial sound.

Thus, combining the classification of the pronunciation mechanism with the pronunciation mechanism of initials and finals may realize the classification of pronunciation mechanism more conveniently and reduce the difficulty of pronunciation mechanism classification. After obtaining each combination category, the combination weight of each phoneme combination may be further acquired. Specifically, the combination weight is a ratio of the number of phoneme combinations with the same combination category to a total number of phonemes in the phoneme sequence.

For the convenience of understanding, an example may be given. When a certain phoneme sequence includes 100 phonemes, if each phoneme forms a phoneme combination, then 100 phoneme combinations may be formed. The combination category may be determined according to the pronunciation mechanism of each phoneme in each phoneme combination, and then each phoneme combination may be classified, assuming that a total of 3 combination categories may be formed.

Then, the number of phoneme combinations in each combination category may be counted, assuming that the first combination category has 20 phoneme combinations, the second combination category has 45 phoneme combinations, and the third phoneme combination has 35 phoneme combinations, then the combination weight may be determined based on the number of phoneme combinations in each combination category. For example: the combination weight of the first combination category may be $20/100=0.2$, the combination weight of the second combination category may be $45/100=0.45$, and the combination weight of the third combination category may be $35/100=0.35$.

Step S34: acquiring, based on the time accuracy score of each phoneme in the phoneme combination of the current phoneme, a time accuracy correction score of the current phoneme.

For the specific content of step S34, reference may be made to the description of step S23 in FIG. 3, and detailed description thereof will be omitted.

Moreover, there is no limitation on an execution order of step S33 and step S34, and the time accuracy correction score may be acquired first to further acquire the combination weight.

Step S35: acquiring, for each phoneme, based on the time accuracy correction score of the phoneme and a combination weight of the phoneme combination corresponding to the phoneme, a weight score of the phoneme.

The weight score of the phoneme may be acquired based on the combination weight obtained in step S33 and the time accuracy correction score obtained in step S34.

Certainly, the combination weight and the time accuracy correction score are acquired based on the same phoneme combination of the same phoneme, and there is a corresponding relationship between the combination weight and the time accuracy correction score.

Specifically, the weight score of each of the phonemes is acquired by multiplying the combination weight by the time accuracy correction score.

Step S36: acquiring the time accuracy score of the to-be-evaluated speech forced alignment model, based on the weight score of each phoneme in the phoneme sequence.

After obtaining the weight score of each phoneme, the time accuracy score of the to-be-evaluated speech forced alignment model may be acquired through the weight score of each phoneme.

Specifically, the time accuracy score of the to-be-evaluated speech forced alignment model may be acquired through the following formula:

$$\text{Score model} = W1*\text{Score}_1 + W2*\text{Score}_2 \ldots + Wn*\text{Score}_n;$$

where: Score model is the time accuracy score of the to-be-evaluated speech forced alignment model, Wn is the combination weight of the $n^{th}$ phoneme, and $\text{Score}_n$ is the time accuracy correction score of the $n^{th}$ phoneme.

The acquisition of the weight score may reduce an impact on the time accuracy score of the to-be-evaluated speech forced alignment model due to the difference in the number of phonemes in the phoneme sequence predicted by different to-be-evaluated speech forced alignment models, and further improving the accuracy of evaluation.

In another embodiment, to further improve correction of the time accuracy score of the current phoneme, multiple phoneme combinations of the same phoneme may be constructed. Specifically, the phoneme combinations of each phoneme may include a two-phoneme combination of 2 phonemes and a three-phoneme combination of 3 phonemes. Certainly, the two-phoneme combination includes the current phoneme and a phoneme directly adjacent to the current phoneme, and the three-phoneme combination includes the current phoneme and two phonemes directly adjacent to the current phoneme. Then, the time accuracy correction score of the current phoneme of each phoneme combination is calculated separately, so as to obtain multiple time accuracy correction scores of the same phoneme, including a two-phoneme time accuracy correction score and a three-phoneme time accuracy correction score, and a two-phoneme combination category and a three-phoneme combination category of the phoneme may be respectively acquired, as well as a two-phoneme combination weight and a three-phoneme combination weight, and a two-phoneme weight score and a three-phoneme weight score may be acquired.

Figure 5:
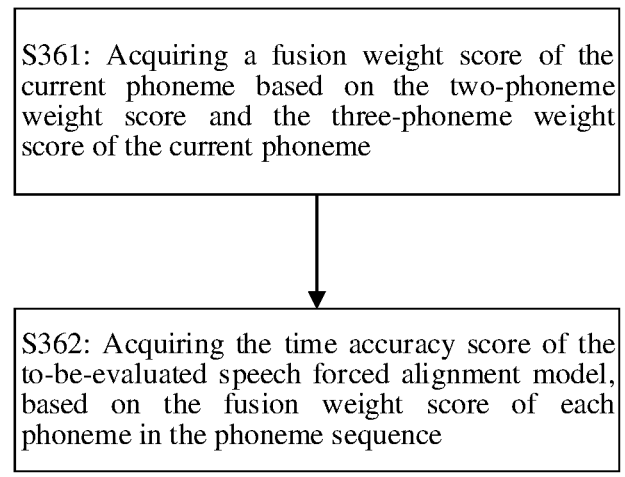
FIG. 5 is a schematic flowchart of steps for acquiring a time accuracy score of a to-be-evaluated speech forced alignment model provided by an embodiment of the present disclosure.

FIG. 5 is a schematic flowchart of steps for acquiring a time accuracy score of a to-be-evaluated speech forced alignment model provided by an embodiment of the present disclosure. The steps for acquiring the time accuracy score of the to-be-evaluated speech forced alignment model may include:

Step S361: acquiring a fusion weight score of the current phoneme based on the two-phoneme weight score and the three-phoneme weight score of the current phoneme.

In a specific embodiment, the fusion weight score may be acquired through the following formula:

$$\text{scorer} = v2*\text{score}'' + v3*\text{score}'''$$

where: $v2 + v3 = 1$, and $v3 > v2$, score is the fusion weight score, score'' is the two-phoneme weight score, v2 is a two-phoneme fusion factor, score' is the three-phoneme weight score, and v3 is a three-phoneme fusion factor.

Thus, the fusion of different weight scores of the same phoneme may be simply realized, and the three-phoneme fusion factor is greater than the two-phoneme fusion factor, which may highlight influence of the three-phoneme combination and further improve the accuracy.

Step S362: acquiring the time accuracy score of the to-be-evaluated speech forced alignment model, based on the fusion weight score of each phoneme in the phoneme sequence.

After obtaining the fusion weight score, the time accuracy score of the to-be-evaluated speech forced alignment model may be acquired, for the specific content, reference may be made to the description of step S12 in FIG. 1, and detailed description thereof will be omitted.

Certainly, in another embodiment, 3 phoneme combinations may be constructed for each phoneme. In addition to the two-phoneme combination composed of 2 phonemes and the three-phoneme combination composed of 3 phonemes, the phoneme further includes a four-phoneme combination composed of 4 phonemes. Then, while acquiring the two-phoneme combination category and the three-phoneme combination category, the two-phoneme combination weight and the three-phoneme combination weight, and the two-phoneme weight score and the three-phoneme weight score of the phoneme, a four-phoneme combination category and a four-phoneme combination weight, as well as a four-phoneme weight score of the phoneme would also be acquired. The steps for acquiring the time accuracy score of the to-be-evaluated speech forced alignment model, based on the weight score of each phoneme in the phoneme sequence may include:

acquiring the fusion weight score of the current phoneme, based on the two-phoneme weight score, the three-phoneme weight score and the four-phoneme weight score of the current phoneme; and acquiring the time accuracy score of the to-be-evaluated speech forced alignment model, based on the fusion weight score of each phoneme in the phoneme sequence.

In a specific embodiment, the fusion weight score may be acquired through the following formula:

$$\text{score} = v2*\text{score}'' + v3*\text{score}''' v4*\text{score}''''; $$

where: $v2 + v3 + v4 = 1$, and $v3 > v2$, $v3 > v4$, score is the fusion weight score, score'' is the two-phoneme weight score, v2 is a two-phoneme fusion factor, score' is the three-phoneme weight score, v3 is a three-phoneme fusion factor, score' is the four-phoneme weight score, and v4 is a four-phoneme fusion factor.

Thus, the fusion of different weight scores of the same phoneme may be simply realized, and the three-phoneme fusion factor is greater than the two-phoneme fusion factor, and the three-phoneme fusion factor is greater than the four-phoneme fusion factor, which may highlight influence of the three-phoneme combination and further improve the accuracy.

The following is an introduction to an apparatus for evaluating a speech forced alignment model provided by an embodiment of the present disclosure. The apparatus for evaluating a speech forced alignment model described below may be considered as an electronic device (such as: PC) for respectively implementing a functional module architecture required for the method for evaluating a speech forced alignment model provided by embodiments of the present disclosure. The content of the apparatus for evaluating a speech forced alignment model described below may be referred to in correspondence with the content of the method for evaluating a speech forced alignment model described above.

Figure 6:
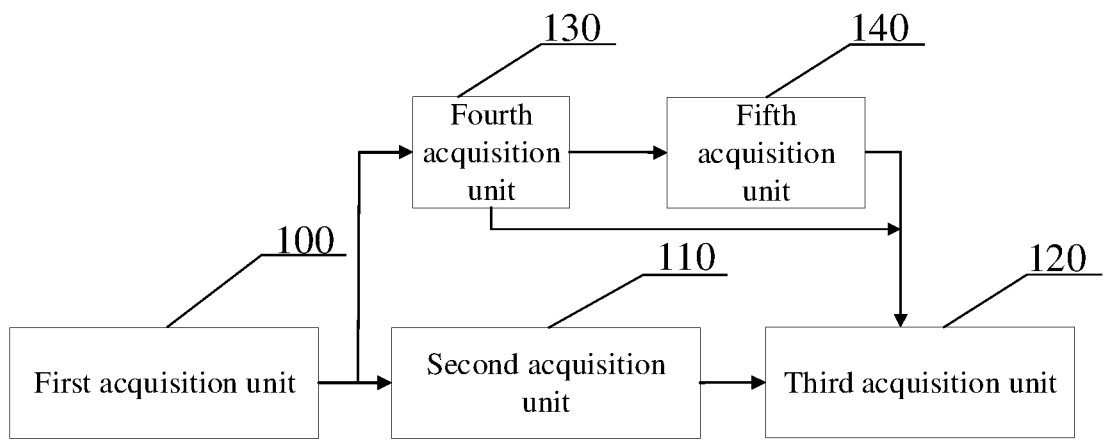
FIG. 6 is a block diagram of an apparatus for evaluating a speech forced alignment model provided by an embodiment of the present disclosure.

FIG. 6 is a block diagram of an apparatus for evaluating a speech forced alignment model provided by an embodiment of the present disclosure. The apparatus for evaluating a speech forced alignment model may be applied to a client or a server. Referring to FIG. 6, the apparatus for evaluating a speech forced alignment model may include:

a first acquisition unit 100, configured to acquire, by using a to-be-evaluated speech forced alignment model, based on each audio segment in a test set and a text corresponding to each audio segment, a phoneme sequence corresponding to each audio segment and a predicted start time and a predicted end time of each phoneme in the phoneme sequence;

a second acquisition unit 110, configured to acquire, for each phoneme, based on the predicted start time and the predicted end time of the phoneme and a predetermined reference start time and a predetermined reference end time of the phoneme, a time accuracy score of the phoneme, where the time accuracy score is indicative of a degree of proximity of the predicted start time and the predicted end time to the reference start time and the reference end time of the phoneme; and a third acquisition unit 120, configured to acquire, based on the time accuracy score of each phoneme, a time accuracy score of the to-be-evaluated speech forced alignment model.

It may be easily understood that the apparatus for evaluating a speech forced alignment model provided by an embodiment of the present disclosure inputs each audio segment in the test set and the text corresponding to each audio segment into the to-be-evaluated speech forced alignment model, so as to obtain the phoneme sequence corresponding to each audio segment and the predicted start time and the predicted end time of each phoneme in each phoneme sequence.

Certainly, the predicted start time and the predicted end time may include a time span from the predicted start time to the predicted end time.

Specifically, the to-be-evaluated speech forced alignment model may include a GMM model (Gaussian mixture model) and a Viterbi (viterbi) decoding model. Each audio segment in the test set and the text corresponding to each audio segment may be input into the GMM model to obtain an undecoded phoneme sequence and the predicted start time and the predicted end time, then decoded by the Viterbi decoding model to obtain the decoded phoneme sequence and the predicted start time and the predicted end time.

It may be understood that the time accuracy score is the degree of proximity of the predicted start time and the predicted end time to the corresponding reference start time and the reference end time corresponding to each of the phonemes.

The reference start time and the reference end time refers to a start time and an end time of phoneme used as an evaluation reference, which may be acquired by manual annotation.

By comparing the degree of proximity of the predicted start time and the predicted end time to the reference start time and the reference end time of the same phoneme, the time accuracy score of the phoneme may be obtained, until the time accuracy score of each phoneme is obtained.

The second acquisition unit 110 includes:

a third acquisition subunit, configured to acquire a start time and end time intersection and a start time and end time union of the predicted start time and the predicted end time and the reference start time and the reference end time of each phoneme, based on the predicted start time and the predicted end time and the reference start time and the reference end time of each phoneme; and a fourth acquisition subunit, configured to obtain the time accuracy score of each phoneme, based on a ratio of the start time and end time intersection to the start time and end time union of each phoneme.

It may be easily understood that the start time and end time intersection of the predicted start time and the predicted end time and the reference start time and the reference end time of the phoneme refers to overlap time of the predicted start time and the predicted end time and the reference start time and the reference end time of the same phoneme, and the start time and end time union of the predicted start time and the predicted end time and the reference start time and the reference end time of the phoneme refers to overall time of the predicted start time and the predicted end time and the reference start time and the reference end time of the same phoneme.

After obtaining the start time and end time intersection and the start time and end time union of each phoneme, the ratio of the two may be further acquired to obtain the time accuracy score of each phoneme.

It may be understood that the greater a ratio score of the start time and end time intersection to the start time and end time union for a phoneme, the higher the accuracy of the to-be-evaluated speech forced alignment model for the phoneme.

Thus, the start time and end time intersection may represent an overlap amount of the predicted start time and the predicted end time and the reference start time and the reference end time, and the start time and end time union may represent a maximum overall amount of the predicted start time and the predicted end time and the reference start time and the reference end time. A weight and degree of the predicted start time and the predicted end time may be accurately expressed using the ratio of the start time and end time intersection to the start time and end time union, thereby acquiring the time accuracy score of the phoneme, and the time accuracy score of the phoneme can accurately represent the degree of proximity of the predicted start time and the predicted end time to the reference start time and the reference end time.

After obtaining the time accuracy score of each phoneme in the test set, the third acquisition unit 120 may acquire the time accuracy score of the to-be-evaluated speech forced alignment model through the time accuracy score of each phoneme.

In a specific embodiment, the time accuracy scores of the phonemes in the test set may be directly added to acquire the time accuracy score of the to-be-evaluated speech forced alignment model.

It may be easily understood that the higher the time accuracy score of each phoneme, the higher the time accuracy score of the to-be-evaluated speech forced alignment model, and the better the forced alignment effect of the to-be-evaluated speech forced alignment model, so as to evaluate the alignment effect of different speech forced alignment models, or evaluate the alignment effect of the speech forced alignment model before and after parameter adjustment.

It can be seen that in the apparatus for evaluating a speech forced alignment model provided by an embodiment of the present disclosure, when evaluating the to-be-evaluated speech forced alignment model, based on the degree of proximity of the predicted start time and the predicted end time to the reference start time and the reference end time of each phoneme, may obtain the time accuracy score of each phoneme, and further obtain the time accuracy score of the to-be-evaluated speech forced alignment model. There is no need to manually retest each time the predicted start time and the predicted end time is acquired through the speech forced alignment model, or to verify the obtained speech through subsequent speech synthesis. The difficulty of evaluating the accuracy of the forced alignment model may be simplified, at the same time, a labor cost and time cost required for evaluating the accuracy of the forced alignment model may also be reduced, improving the efficiency.

In order to further improve the accuracy for evaluating the speech forced alignment model, an embodiment of the present disclosure further provides an apparatus for evaluating a speech forced alignment model.

As shown in FIG. 6, the apparatus for evaluating a speech forced alignment model provided by an embodiment of the present disclosure further includes:

a fourth acquisition unit 130, configured to determine a current phoneme, and construct a phoneme combination of the current phoneme to acquire the phoneme combination of each phoneme.

The phoneme combination includes the current phoneme and at least one phoneme adjacent to the current phoneme, and a combination method of the phoneme combination of each phoneme is identical.

After obtaining the phoneme sequence of each audio segment in the test set, a phoneme in the phoneme sequence is determined as the current phoneme, then at least one phoneme adjacent to the current phoneme is determined to form a phoneme combination with the current phoneme, thereby obtaining the phoneme combination corresponding to the current phoneme in the phoneme sequence. Each phoneme in the phoneme sequence is determined one by one as the current phoneme, so as to obtain the phoneme combination corresponding to each phoneme in the phoneme sequence.

It may be understood that, if the phoneme combination is composed of 2 phonemes, it may be determined that an adjacent phoneme preceding the current phoneme and the current phoneme form the phoneme combination, certainly it may also be determined that an adjacent phoneme following the current phoneme and the current phoneme form the phoneme combination. If the phoneme combination is composed of 3 phonemes, it may be determined that adjacent phonemes preceding and following the current phoneme and the current phoneme form the phoneme combination. If the phoneme combination is composed of 4 phonemes, it may be determined that 2 phonemes preceding the current phoneme and 1 phoneme following the current phoneme, and the current phoneme form the phoneme combination, certainly, 1 phoneme preceding the current phoneme and 2 phonemes following the current phoneme may also be selected.

Since the start time and the end time of each phoneme may be affected by its adjacent phonemes, taking the current phoneme and the adjacent phonemes into account to form the phoneme combination may provide subsequent corrections to the time accuracy score of the current phoneme.

The third acquisition unit 120 includes:

a first acquisition subunit, configured to acquire, based on the time accuracy score of each phoneme in each phoneme combination, a time accuracy correction score of the current phoneme in each phoneme combination, to obtain a time accuracy correction score of each phoneme in the phoneme sequence; and a second acquisition subunit, configured to acquire the time accuracy score of the to-be-evaluated speech forced alignment model, based on the time accuracy correction score of each phoneme in the phoneme sequence.

After obtaining the phoneme combination of each phoneme, when each phoneme is constructed with 1 phoneme combination, the time accuracy score of each phoneme in the phoneme combination corresponding to the current phoneme is used to acquire the time accuracy correction score of the current phoneme.

For example, the phoneme combination includes 3 phonemes, and the phoneme combination of the current phoneme "t" is "intian", the time accuracy correction score of the current phoneme t may be:

$$\text{Score}(t)' = [\text{Score}(in) + \text{Score}(t) + \text{Score}(ian)]/3$$

Then, the time accuracy score of the to-be-evaluated speech forced alignment model is acquired by using the time accuracy correction score of each phoneme.

Thus, the apparatus for evaluating a speech forced alignment model provided by an embodiment of the present disclosure uses the time accuracy score of at least one phoneme adjacent to the current phoneme to correct the time accuracy score of the current phoneme, and uses context information of the current phoneme, taking into account the influence to the current phoneme by its adjacent phoneme, so that the obtained time accuracy score of the current phoneme is corrected to be more accurate.

In order to further improve the accuracy of evaluation, the apparatus for evaluating a speech forced alignment model provided by an embodiment of the present disclosure further includes:

a fifth acquisition unit 140, configured to classify the phoneme combination according to a pronunciation mechanism of each phoneme in the phoneme combination to obtain a combination category of the phoneme combination; and determine the number of phoneme combinations with a same combination category and a corresponding combination weight, based on the combination category of each phoneme combination.

The second acquisition subunit included in the third acquisition unit 120 includes:

a first acquisition module, configured to acquire, for each phoneme, based on the time accuracy correction score of the phoneme and a combination weight of the phoneme combination corresponding to the phoneme, a weight score of the phoneme; and a second acquisition module, configured to acquire the time accuracy score of the to-be-evaluated speech forced alignment model, based on the weight score of each phoneme in the phoneme sequence.

After obtaining the phoneme combination of each current phoneme, classification may be performed according to the pronunciation mechanism of each phoneme in the phoneme combination. Different pronunciation mechanism of adjacent phonemes may have a certain influence on parameters of the current phoneme, therefore, classification may be performed according to the pronunciation mechanism of each phoneme in the phoneme combination to determine the combination category of each phoneme combination, then, according to the combination category of the phoneme combination, the number of phoneme combinations with the same combination category may be determined, to further acquire the combination weight of a certain category of phoneme combination, and further acquire the weight score of each phoneme based on the combination weight, thereby reducing a difference in the time accuracy score of the to-be-evaluated speech forced alignment model due to a difference in the number of phonemes obtained based on the test set, and improving the evaluation accuracy of the method for evaluating a speech forced alignment model provided by embodiments of the present disclosure. Specifically, the pronunciation mechanism may be divided according to initials and finals respectively, including a initial pronunciation mechanism and a final pronunciation mechanism, where the initial pronunciation mechanism includes a part pronunciation mechanism classified based on a pronunciation body part and a method pronunciation mechanism classified based on a pronunciation method, and the final pronunciation mechanism includes a structure pronunciation mechanism classified based on a structure and a mouth shape pronunciation mechanism classified based on a mouth shape.

Thus, combining the classification of the pronunciation mechanism with the pronunciation mechanism of initials and finals may realize the classification of pronunciation mechanism more conveniently and reduce the difficulty of pronunciation mechanism classification.

After obtaining each combination category, the combination weight of each phoneme combination may be further acquired. Specifically, the combination weight is a ratio of the number of phoneme combinations with the same combination category to a total number of phonemes in the phoneme sequence.

For the convenience of understanding, an example may be given. When a certain phoneme sequence includes 100 phonemes, if each phoneme forms a phoneme combination, then 100 phoneme combinations may be formed. The combination category may be determined according to the pronunciation mechanism of each phoneme in each phoneme combination, and then each phoneme combination may be classified, assuming that a total of 3 combination categories may be formed.

Then, the number of phoneme combinations in each combination category may be counted, assuming that the first combination category has 20 phoneme combinations, the second combination category has 45 phoneme combinations, and the third phoneme combination has 35 phoneme combinations, then the combination weight may be determined based on the number of phoneme combinations in each combination category. For example: the combination weight of the first combination category may be $20/100=0.2$, the combination weight of the second combination category may be $45/100=0.45$, and the combination weight of the third combination category may be $35/100=0.35$.

Then, the weight score of the phoneme may be acquired based on the combination weight and the time accuracy correction score.

Certainly, the combination weight and the time accuracy correction score are acquired based on the same phoneme combination of the same phoneme, and there is a corresponding relationship between the combination weight and the time accuracy correction score.

Specifically, the weight score of each of the phonemes is acquired by multiplying the combination weight by the time accuracy correction score.

After obtaining the weight score of each phoneme, the time accuracy score of the to-be-evaluated speech forced alignment model may be acquired through the weight score of each phoneme.

Specifically, the time accuracy score of the to-be-evaluated speech forced alignment model may be acquired through the following formula:

Score model=$W1*Score_1+W2*Score_2 \ldots +Wn*Score_n$;

where: Score model is the time accuracy score of the to-be-evaluated speech forced alignment model, Wn is the combination weight of the $n^{th}$ phoneme, and $Score_n$ is the time accuracy correction score of the $n^{th}$ phoneme.

The acquisition of the weight score may reduce an impact on the time accuracy score of the to-be-evaluated speech forced alignment model due to the difference in the number of phonemes in the phoneme sequence predicted by different to-be-evaluated speech forced alignment models, and further improving the accuracy of evaluation.

In another embodiment, in order to improve the accuracy of the evaluation, multiple phoneme combinations of the same phoneme may also be constructed. The phoneme combinations of each phoneme may include a two-phoneme combination of 2 phonemes and a three-phoneme combination of 3 phonemes. Certainly, the two-phoneme combination includes the current phoneme and a phoneme directly adjacent to the current phoneme, and the three-phoneme combination includes the current phoneme and two phonemes directly adjacent to the current phoneme.

Constructing multiple phoneme combinations for the same phoneme may further improve the correction to the time accuracy score of the current phoneme using the multiple phoneme combinations.

When the same phoneme includes multiple phoneme combinations, the time accuracy correction score of the current phoneme of each phoneme combination is calculated separately, so as to obtain multiple time accuracy correction scores of the same phoneme.

When the same phoneme has at least two phoneme combinations at the same time, for example: two-phoneme combination and three-phoneme combination, then a two-phoneme combination category and a three-phoneme combination category of the phoneme may be respectively acquired, as well as a two-phoneme combination weight and a three-phoneme combination weight.

When the same phoneme is constructed with a two-phoneme combination and a three-phoneme combination at the same time, the combination weight includes a two-phoneme combination weight and a three-phoneme combination weight, the time accuracy correction score includes a two-phoneme time accuracy correction score and a three-phoneme time accuracy correction score, and the obtained weight score includes a two-phoneme weight score and a three-phoneme weight score.

It may be easily understood that when the weight score of the same phoneme includes the two-phoneme weight score and the three-phoneme weight score, in order to ensure the acquisition of the time accuracy score of the to-be-evaluated speech forced alignment model, the second acquisition module in the second acquisition subunit included in the third acquisition unit 120 of the apparatus for evaluating a speech forced alignment model provided by an embodiment of the present disclosure includes:

a first acquisition submodule, configured to acquire a fusion weight score of the current phoneme based on the two-phoneme weight score and the three-phoneme weight score of the current phoneme; and a second acquisition submodule, configured to acquire the time accuracy score of the to-be-evaluated speech forced alignment model, based on the fusion weight score of each phoneme in the phoneme sequence.

In a specific embodiment, the fusion weight score may be acquired through the following formula:

score=$v2*score''+v3*score'''$;

where: $v2+v3=1$, and $v3>v2$; score is the fusion weight score; score'' is the two-phoneme weight score; v2 is a two-phoneme fusion factor; score''' is the three-phoneme weight score; and v3 is a three-phoneme fusion factor.

Thus, the fusion of different weight scores of the same phoneme may be simply realized, and the three-phoneme fusion factor is greater than the two-phoneme fusion factor, which may highlight influence of the three-phoneme combination and further improve the accuracy.

After obtaining the fusion weight score, the time accuracy score of the to-be-evaluated speech forced alignment model may be further acquired.

Certainly, in another embodiment, in order to improve the accuracy, the fourth acquisition unit 130 may further construct 3 phoneme combinations for each phoneme. In addition to the two-phoneme combination composed of 2 phonemes and the three-phoneme combination composed of 3 phonemes, the fourth acquisition unit 130 may further construct a four-phoneme combination composed of 4 phonemes. The fifth acquisition unit 140 is further configured to acquire a four-phoneme combination category and a four-phoneme combination weight of the phoneme. The first acquisition module in the second acquisition subunit included in the third acquisition unit 120 is configured to acquire a four-phoneme weight score. The second acquisition module in the second acquisition subunit includes:

a third acquisition submodule, configured to acquire the fusion weight score of the current phoneme, based on the two-phoneme weight score, the three-phoneme weight score and the four-phoneme weight score of the current phoneme; and a fourth acquisition submodule, configured to acquire the time accuracy score of the to-be-evaluated speech forced alignment model, based on the fusion weight score of each phoneme in the phoneme sequence.

In a specific embodiment, the fusion weight score may be acquired through the following formula:

$$score = v2*score'' + v3*score''' + v4*score'''';$$

where: v2+v3+v4=1, and v3>v2, v3>v4; score is the fusion weight score; score'' is the two-phoneme weight score; v2 is a two-phoneme fusion factor; score''' is the three-phoneme weight score; v3 is a three-phoneme fusion factor; score'''' is the four-phoneme weight score; and v4 is a four-phoneme fusion factor.

Thus, the fusion of different weight scores of the same phoneme may be simply realized, and the three-phoneme fusion factor is greater than the two-phoneme fusion factor, and the three-phoneme fusion factor is greater than the four-phoneme fusion factor, which may highlight influence of the three-phoneme combination and further improve the accuracy.

Certainly, an embodiment of the present disclosure further provides an electronic device, the electronic device provided by the embodiment of the present disclosure may be loaded with the above program module architecture in the form of a program, so as to implement the method for evaluating a speech forced alignment model provided by embodiments of the present disclosure; the hardware electronic device may be applied to an electronic device capable of data processing, and the electronic device may be, for example, a terminal device or a server device.

Figure 7:
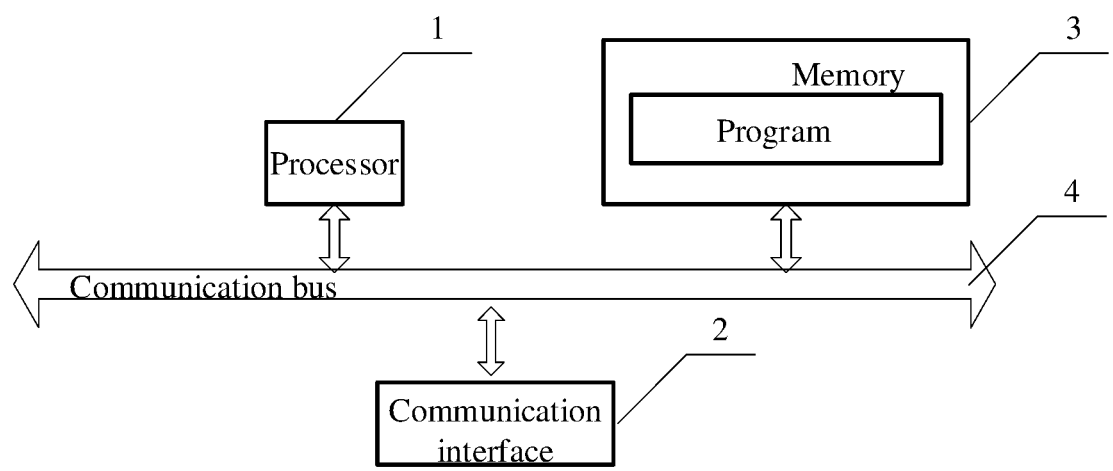
FIG. 7 is an optional hardware device architecture of an electronic device provided by an embodiment of the present disclosure.

Alternatively, FIG. 7 shows an optional hardware device architecture provided by an embodiment of the present disclosure, which may include: at least one memory 3 and at least one processor 1; the memory stores program instructions, and the processor executes the program instructions to perform the foregoing method for evaluating a speech forced alignment model, in addition, at least one communication interface 2 and at least one communication bus 4; the processor 1 and the memory 3 may be located in the same electronic device, for example, the processor 1 and the memory 3 may be located in a server device or a terminal device; the processor 1 and the memory 3 may also be located in different electronic devices.

As an optional implementation of the content disclosed in the embodiments of the present disclosure, the memory 3 may store program instructions, and the processor 1 may execute the program instructions to perform the method for evaluating a speech forced alignment model provided by embodiments of the present disclosure.

In an embodiment of the present disclosure, the electronic device may be a device such as a tablet computer, a notebook computer, capable of evaluating a speech forced alignment model.

In an embodiment of the present disclosure, the number of the processor 1, the communication interface 2, the memory 3, and the communication bus 4 is at least one, and the processor 1, the communication interface 2, and the memory 3 complete mutual communication via the communication bus 4; obviously, the schematic diagram of the communication connection of the processor 1, the communication interface 2, the memory 3 and the communication bus 4 shown in FIG. 7 is only an optional mode.

Alternatively, the communication interface 2 may be an interface of a communication module, such as an interface of a GSM module.

The processor 1 may be a central processing unit CPU, or an application specific integrated circuit (ASIC), or one or more integrated circuits configured to implement the embodiments of the present disclosure.

The memory 3 may include a high-speed RAM memory, and may also include a non-volatile memory, such as at least one disk memory.

It should be noted that the above device may also include other devices (not shown) that may not be necessary for the disclosure of the embodiments of the present disclosure; in view of the fact that these other devices may not be necessary for understanding the disclosure of the embodiments of the present disclosure, the embodiments of the present disclosure do not introduce each of these one by one.

An embodiment of the present disclosure further provides a computer-readable storage medium, the computer-readable storage medium stores computer-executable instructions, the instructions, when executed by a processor, implement the method for evaluating a speech forced alignment model.

The computer-executable instructions stored in the storage medium provided by an embodiment of the present disclosure, when evaluating the to-be-evaluated speech forced alignment model, based on the degree of proximity of the predicted start time and the predicted end time to the reference start time and the reference end time of each phoneme, may obtain the time accuracy score of each phoneme, and further obtain the time accuracy score of the to-be-evaluated speech forced alignment model. There is no need to manually retest each time the predicted start time and the predicted end time is acquired through the speech forced alignment model, or to verify the obtained speech through subsequent speech synthesis. The difficulty of evaluating the accuracy of the forced alignment model may be simplified, at the same time, a labor cost and time cost required for evaluating the accuracy of the forced alignment model may also be reduced, improving the efficiency.

The embodiments of the present disclosure are combinations of elements and features of the present disclosure. The elements or features may be considered optional unless mentioned otherwise. Each element or feature may be practiced without being combined with other elements or features. In addition, the embodiments of the present disclosure may be configured by combining some elements and/or features. The order of operations described in the embodiments of the present disclosure may be rearranged. Some constructions of any one embodiment may be included in another embodiment, and may be replaced with corresponding constructions of another embodiment. It is obvious to those skilled in the art that claims that have no explicit citation relationship with each other among the appended claims may be combined into embodiments of the present disclosure, or may be included as new claims in amendments after filing the present disclosure.

The embodiments of the present disclosure may be realized by various means such as hardware, firmware, software, or a combination thereof. In a hardware configuration mode, the method according to exemplary embodiments of the present disclosure may be implemented by one or more application specific integrated circuits (ASIC), digital signal processors (DSP), digital signal processing devices (DSPD), programmable logic devices (PLD), field programmable gate arrays (FPGA), processors, controllers, microcontrollers, micro-processors, etc.

In a firmware or software configuration, the embodiments of the present disclosure may be implemented in the form of modules, procedures, functions, or the like. Software codes may be stored in a memory unit and executed by a processor. The memory unit is located inside or outside the processor, and may transmit data to and receive data from the processor via various known means.

The above description of the disclosed embodiments is provided to enable those skilled in the art to make or use the present disclosure. Various modifications to these embodiments will be readily apparent to those skilled in the art, and general principles defined herein may be implemented in other embodiments without departing from the spirit or scope of the present disclosure. Therefore, the present disclosure will not be limited to the embodiments shown herein, but is to be accorded the widest scope consistent with the principles and novel features disclosed herein.

Although the embodiments of the present disclosure are disclosed above, the present disclosure is not limited thereto. Any person skilled in the art can make various changes and modifications without departing from the spirit and scope of the present disclosure. Therefore, the protection scope of the present disclosure should be determined by the scope defined in the claims.

What is claimed is:

1. A method for evaluating a speech forced alignment model applied in speech synthesis, the method comprising:
   acquiring, by a processor using a to-be-evaluated speech forced alignment model applied in speech synthesis, based on each audio segment in a test set and a text corresponding to each of the audio segments, a phoneme sequence corresponding to each of the audio segments and a predicted start time and a predicted end time of each phoneme in the phoneme sequence;
   acquiring, for each phoneme, by the processor, based on the predicted start time and the predicted end time of the phoneme and a predetermined reference start time and a predetermined reference end time of the phoneme, a time accuracy score of the phoneme, wherein the time accuracy score is a degree of proximity of the predicted start time and the predicted end time of each of the phonemes to the reference start time and the reference end time corresponding to the predicted start time and the predicted end time; and
   acquiring, by the processor, based on the time accuracy score of each of the phonemes, a time accuracy score of the to-be-evaluated speech forced alignment model, wherein the to-be-evaluated speech forced alignment model includes a GMM model (Gaussian mixture model) and a Viterbi decoding model, wherein each audio segment in the test set and the text corresponding to each audio segment is input into the GMM model to obtain an undecoded phoneme sequence, the predicted start time and the predicted end time; and
   decoding the undecoded phoneme sequence by the Viterbi decoding model to obtain the decoded phoneme sequence and the predicted start time and the predicted end time.

2. The method according to claim 1, wherein before the acquiring, by the processor, based on the time accuracy score of each of the phonemes, the time accuracy score of the to-be-evaluated speech forced alignment model, the method further comprises:
   determining a current phoneme, and constructing a phoneme combination of the current phoneme to acquire the phoneme combination of each phoneme, wherein the phoneme combination of the current phoneme comprises the current phoneme and at least one phoneme adjacent to the current phoneme, and wherein a combination method of the phoneme combination for each phoneme is identical; and
   the acquiring, by the processor, based on the time accuracy score of each of the phonemes, the time accuracy score of the to-be-evaluated speech forced alignment model comprises:
      acquiring, based on the time accuracy score of each phoneme in each of the phoneme combinations, a time accuracy correction score of the current phoneme in each of the phoneme combinations, to obtain a time accuracy correction score of each phoneme in the phoneme sequence; and
      acquiring the time accuracy score of the to-be-evaluated speech forced alignment model, based on the time accuracy correction score of each phoneme in the phoneme sequence.

3. The method according to claim 2, wherein:
after the determining the current phoneme, and constructing the phoneme combination of the current phoneme to acquire the phoneme combination of each phoneme:
the method further comprises:
   classifying the phoneme combination according to a pronunciation mechanism of each phoneme in the phoneme combination to obtain a combination category of the phoneme combination; and
   determining a number of phoneme combinations with a same combination category and a corresponding combination weight, based on the combination category of each phoneme combination, wherein the combination weight is a ratio of the number of the phoneme combinations with the same combination category to a total number of the phonemes in the phoneme sequence; and
the acquiring the time accuracy score of the to-be-evaluated speech forced alignment model, based on the time accuracy correction score of each phoneme in the phoneme sequence, comprises:
   acquiring, for each phoneme, based on the time accuracy correction score of the phoneme and the combination weight of the phoneme combination corresponding to the phoneme, a weight score of the phoneme; and
   acquiring the time accuracy score of the to-be-evaluated speech forced alignment model, based on the weight score of each phoneme in the phoneme sequence.

4. The method according to claim 3, wherein the phoneme combination of the current phoneme comprises a two-phoneme combination and a three-phoneme combination, the two-phoneme combination comprises the current phoneme and a phoneme directly adjacent to the current phoneme, and the three-phoneme combination comprises the current phoneme and two phonemes directly adjacent to the current phoneme;

the combination category comprises each two-phoneme combination category and each three-phoneme combination category, the combination weight comprises a two-phoneme combination weight corresponding to each of the two-phoneme combination categories and a three-phoneme combination weight corresponding to each of the three-phoneme combination categories, the time accuracy correction score comprises a two-phoneme time accuracy correction score and a three-phoneme time accuracy correction score of the current phoneme, and the weight score comprises a two-phoneme weight score and a three-phoneme weight score of the current phoneme; and the acquiring the time accuracy score of the to-be-evaluated speech forced alignment model, based on the weight score of each phoneme in the phoneme sequence, comprises:

acquiring a fusion weight score of the current phoneme based on the two-phoneme weight score and the three-phoneme weight score of the current phoneme; and acquiring the time accuracy score of the to-be-evaluated speech forced alignment model, based on the fusion weight score of each phoneme in the phoneme sequence.

5. The method according to claim 4, wherein the two-phoneme combination comprises the current phoneme and a phoneme preceding the current phoneme.

6. The method according to claim 4, wherein the fusion weight score is obtained through a formula:

$$score = v2*score'' + v3*score''';$$

wherein: $v2+v3=1$, and $v3>v2$, score is the fusion weight score, $score''$ is the two-phoneme weight score, $v2$ is a two-phoneme fusion factor, $score'''$ is the three-phoneme weight score, and $v3$ is a three-phoneme fusion factor.

7. The method according to claim 4, wherein the phoneme combination of the current phoneme further comprises a four-phoneme combination, and the four-phoneme combination comprises the current phoneme and three phonemes adjacent to the current phoneme;

the combination category further comprises each four-phoneme combination category, the combination weight further comprises a four-phoneme combination weight corresponding to each of the four-phoneme combination categories, the time accuracy correction score further comprises a four-phoneme time accuracy correction score of the current phoneme, and the weight score further comprises a four-phoneme weight score of the current phoneme; and the acquiring the time accuracy score of the to-be-evaluated speech forced alignment model, based on the weight score of each phoneme in the phoneme sequence, comprises:

acquiring the fusion weight score of the current phoneme, based on the two-phoneme weight score, the three-phoneme weight score and the four-phoneme combination of the current phoneme; and acquiring the time accuracy score of the to-be-evaluated speech forced alignment model, based on the fusion weight score of each phoneme in the phoneme sequence.

8. The method according to claim 7, wherein the fusion weight score is obtained through a formula:

$$score = v2*score'' + v3*score''' + v4*score'''';$$

wherein: $v2+v3+v4=1$, and $v3>v2$, $v3>v4$, score is the fusion weight score, $score''$ is the two-phoneme weight score, $v2$ is a two-phoneme fusion factor, $score'''$ is the three-phoneme weight score, $v3$ is a three-phoneme fusion factor, $score''''$ is the four-phoneme weight score, and $v4$ is a four-phoneme fusion factor.

9. The method according to claim 4, wherein the acquiring, for each phoneme, by the processor, based on the predicted start time and the predicted end time of the phoneme and the predetermined reference start time and the predetermined reference end time of the phoneme, the time accuracy score of the phoneme, comprises:

acquiring a start time and end time intersection and a start time and end time union of the predicted start time and the predicted end time and the reference start time and the reference end time of each of the phonemes; and obtaining the time accuracy score of each of the phonemes, based on a ratio of the start time and end time intersection to the start time and end time union of each phoneme.

10. The method according to claim 3, wherein the time accuracy score of the to-be-evaluated speech forced alignment model is obtained through a formula as follows:

$$\text{Score model} = W1*\text{Score}_1 + W2*\text{Score}_2 \ldots + Wn*\text{Score}_n,$$

wherein, Score model is the time accuracy score of the to-be-evaluated speech forced alignment model, Wn is the combination weight of the $n^{th}$ phoneme, and $\text{Score}_n$ is the time accuracy correction score of the $n^{th}$ phoneme.

11. The method according to claim 3, wherein the pronunciation mechanism comprises a initial pronunciation mechanism and a final pronunciation mechanism, the initial pronunciation mechanism comprises a part pronunciation mechanism classified based on a pronunciation body part and a method pronunciation mechanism classified based on a pronunciation method, and the final pronunciation mechanism comprises a structure pronunciation mechanism classified based on a structure and a mouth shape pronunciation mechanism classified based on a mouth shape.

12. The method according to claim 1, wherein the acquiring, for each phoneme, by the processor, based on the predicted start time and the predicted end time of the phoneme and the predetermined reference start time and the predetermined reference end time of the phoneme, the time accuracy score of the phoneme, comprises:

acquiring a start time and end time intersection and a start time and end time union of the predicted start time and the predicted end time and the reference start time and the reference end time of each of the phonemes; and obtaining the time accuracy score of each of the phonemes, based on a ratio of the start time and end time intersection to the start time and end time union of each phoneme.

13. A non-transitory storage medium, wherein the non-transitory storage medium has program instructions stored thereon for evaluating a speech forced alignment model applied in speech synthesis, so as to implement a method comprising:

acquiring, by a processor using a to-be-evaluated speech forced alignment model applied in speech synthesis, based on each audio segment in a test set and a text corresponding to each of the audio segments, a phoneme sequence corresponding to each of the audio segments and a predicted start time and a predicted end time of each phoneme in the phoneme sequence;

acquiring, for each phoneme, by the processor, based on the predicted start time and the predicted end time of the phoneme and a predetermined reference start time and a predetermined reference end time of the phoneme, a time accuracy score of the phoneme, wherein the time accuracy score is a degree of proximity of the predicted start time and the predicted end time of each of the phonemes to the reference start time and the reference end time corresponding to the predicted start time and the predicted end time; and acquiring, by the processor, based on the time accuracy score of each of the phonemes, a time accuracy score of the to-be-evaluated speech forced alignment model, wherein the to-be-evaluated speech forced alignment model includes a GMM model (Gaussian mixture model) and a Viterbi decoding model, wherein each audio segment in the test set and the text corresponding to each audio segment is input into the GMM model to obtain an undecoded phoneme sequence, the predicted start time and the predicted end time; and decoding the undecoded phoneme sequence by the Viterbi decoding model to obtain the decoded phoneme sequence and the predicted start time and the predicted end time.

14. An electronic device of performing a method for evaluating a speech forced alignment model applied in speech synthesis, comprising:

at least one memory; and at least one processor, wherein, the memory has program instructions stored thereon, and the processor is configured to execute the program instructions to:

acquire, by the at least one processor using a to-be-evaluated speech forced alignment model applied in speech synthesis, based on each audio segment in a test set and a text corresponding to each of the audio segments, a phoneme sequence corresponding to each of the audio segments and a predicted start time and a predicted end time of each phoneme in the phoneme sequence;

acquire, for each phoneme, by the at least one processor, based on the predicted start time and the predicted end time of the phoneme and a predetermined reference start time and a predetermined reference end time of the phoneme, a time accuracy score of the phoneme, wherein the time accuracy score is a degree of proximity of the predicted start time and the predicted end time of each of the phonemes to the reference start time and the reference end time corresponding to the predicted start time and the predicted end time; and acquire, by the at least one processor, based on the time accuracy score of each of the phonemes, a time accuracy score of the to-be-evaluated speech forced alignment model, wherein the to-be-evaluated speech forced alignment model includes a GMM model (Gaussian mixture model) and a Viterbi decoding model, wherein each audio segment in the test set and the text corresponding to each audio segment is input into the GMM model to obtain an undecoded phoneme sequence, the predicted start time and the predicted end time and then decoded by the Viterbi decoding model to obtain the decoded phoneme sequence and the predicted start time and the predicted end time.

15. The electronic device according to claim 14, wherein:

before the acquiring, by the at least one processor, based on the time accuracy score of each of the phonemes, a time accuracy score of the to-be-evaluated speech forced alignment model, the processor is further configured to execute the program instructions to: determine a current phoneme, and construct a phoneme combination of the current phoneme to acquire the phoneme combination of each phoneme, wherein the phoneme combination of the current phoneme comprises the current phoneme and at least one phoneme adjacent to the current phoneme, and wherein a combination method of the phoneme combination for each phoneme is identical; and the acquiring, based on the time accuracy score of each of the phonemes, the time accuracy score of the to-be-evaluated speech forced alignment model comprises:

acquiring, based on the time accuracy score of each phoneme in each of the phoneme combinations, a time accuracy correction score of the current phoneme in each of the phoneme combinations, to obtain a time accuracy correction score of each phoneme in the phoneme sequence; and acquiring the time accuracy score of the to-be-evaluated speech forced alignment model, based on the time accuracy correction score of each phoneme in the phoneme sequence.

16. The electronic device according to claim 15, wherein:

before the determining the current phoneme, and constructing the phoneme combination of the current phoneme to acquire the phoneme combination of each phoneme, the processor is further configured to execute the program instructions to:

classify the phoneme combination according to a pronunciation mechanism of each phoneme in the phoneme combination to obtain a combination category of the phoneme combination; and determine a number of phoneme combinations with a same combination category and a corresponding combination weight, based on the combination category of each phoneme combination, wherein the combination weight is a ratio of the number of the phoneme combinations with the same combination category to a total number of the phonemes in the phoneme sequence; and the acquiring the time accuracy score of the to-be-evaluated speech forced alignment model, based on the time accuracy correction score of each phoneme in the phoneme sequence, comprises:

acquiring, for each phoneme, based on the time accuracy correction score of the phoneme and the combination weight of the phoneme combination corresponding to the phoneme, a weight score of the phoneme; and acquiring the time accuracy score of the to-be-evaluated speech forced alignment model, based on the weight score of each phoneme in the phoneme sequence.

17. The electronic device according to claim 16, wherein:

the phoneme combination of the current phoneme comprises a two-phoneme combination and a three-phoneme combination, the two-phoneme combination comprises the current phoneme and a phoneme directly adjacent to the current phoneme, and the three-phoneme combination comprises the current phoneme and two phonemes directly adjacent to the current phoneme;

the combination category comprises each two-phoneme combination category and each three-phoneme combination category, the combination weight comprises a two-phoneme combination weight corresponding to each of the two-phoneme combination categories and a three-phoneme combination weight corresponding to each of the three-phoneme combination categories, the time accuracy correction score comprises a two-phoneme time accuracy correction score and a three-phoneme time accuracy correction score of the current phoneme, and the weight score comprises a two-phoneme weight score and a three-phoneme weight score of the current phoneme; and the acquiring the time accuracy score of the to-be-evaluated speech forced alignment model, based on the weight score of each phoneme in the phoneme sequence, comprises:

acquiring a fusion weight score of the current phoneme based on the two-phoneme weight score and the three-phoneme weight score of the current phoneme; and acquiring the time accuracy score of the to-be-evaluated speech forced alignment model, based on the fusion weight score of each phoneme in the phoneme sequence.

18. The electronic device according to claim 17, wherein, the fusion weight score is obtained through a formula:

$$score = v2*score'' + v3*score'''$$

wherein: $v2+v3=1$, and $v3>v2$, score is the fusion weight score, score'' is the two-phoneme weight score, $v2$ is a two-phoneme fusion factor, score''' is the three-phoneme weight score, and $v3$ is a three-phoneme fusion factor.

19. The electronic device according to claim 17, wherein, the phoneme combination of the current phoneme further comprises a four-phoneme combination, and the four-phoneme combination comprises the current phoneme and three phonemes adjacent to the current phoneme;

the combination category further comprises each four-phoneme combination category, the combination weight further comprises a four-phoneme combination weight corresponding to each of the four-phoneme combination categories, the time accuracy correction score further comprises a four-phoneme time accuracy correction score of the current phoneme, and the weight score further comprises a four-phoneme weight score of the current phoneme; and the acquiring the time accuracy score of the to-be-evaluated speech forced alignment model, based on the weight score of each phoneme in the phoneme sequence, comprises:

acquiring the fusion weight score of the current phoneme, based on the two-phoneme weight score, the three-phoneme weight score and the four-phoneme weight score of the current phoneme; and acquiring the time accuracy score of the to-be-evaluated speech forced alignment model, based on the fusion weight score of each phoneme in the phoneme sequence.

20. The electronic device according to claim 17, wherein, when performing the acquiring, by the at least processor, for each phoneme, based on the predicted start time and the predicted end time of the phoneme and a predetermined reference start time and a predetermined reference end time of the phoneme, a time accuracy score of the phoneme, the at least one processor is specifically configured to:

acquire a start time and end time intersection and a start time and end time union of the predicted start time and the predicted end time and the reference start time and the reference end time of each of the phonemes; and obtain the time accuracy score of each of the phonemes, based on a ratio of the start time and end time intersection to the start time and end time union of each phoneme.

* * * * *